United States Patent [19]
Ford

[11] Patent Number: 5,236,658
[45] Date of Patent: Aug. 17, 1993

[54] PROCESS AND APPARATUS FOR HEAT FORMING OF MATERIALS

[75] Inventor: Valda Ford, Peakhurst, Australia

[73] Assignee: Norford Industries Pty. Ltd., Peakhurst, Australia

[21] Appl. No.: 654,639

[22] PCT Filed: Aug. 18, 1989

[86] PCT No.: PCT/AU89/00353

§ 371 Date: Apr. 5, 1991

§ 102(e) Date: Apr. 5, 1991

[87] PCT Pub. No.: WO90/02036

PCT Pub. Date: Mar. 8, 1990

[30] Foreign Application Priority Data

Aug. 18, 1988 [AU] Australia ............................ P 9966

[51] Int. Cl.$^5$ .......................................... B29C 51/10
[52] U.S. Cl. .................................. 264/553; 264/299; 264/339; 425/388; 425/395; 425/405.1
[58] Field of Search ............... 425/383, 388, 395, 396, 425/405.1; 264/101, 295, 296, 299, 339, 553, 571; 156/285, 382

[56] References Cited

U.S. PATENT DOCUMENTS

| | | | |
|---|---|---|---|
| 3,153,813 | 10/1964 | Swick | 425/388 |
| 3,156,012 | 11/1964 | Hritz | 425/388 |
| 3,273,203 | 9/1966 | Ross | 425/388 |
| 3,319,295 | 5/1967 | Jones-Hinton et al. | 425/388 |
| 3,466,706 | 9/1969 | Asano | 425/388 |
| 3,649,152 | 3/1972 | Knack, Sr. | 425/405.1 |
| 3,728,799 | 4/1973 | Streltson | 425/383 |
| 3,794,458 | 2/1974 | Iwasaki | 425/405.1 |
| 3,887,321 | 6/1975 | Hijikata et al. | 425/388 |
| 3,997,286 | 12/1976 | Gabrys | 425/405.1 |
| 4,147,486 | 4/1979 | Jahnle | 425/383 |
| 4,217,157 | 8/1980 | Stotler et al. | 425/812 |
| 4,234,373 | 11/1980 | Reavill et al. | 425/405.1 |
| 4,417,864 | 11/1983 | Shigeo et al. | 425/405.1 |
| 4,740,342 | 4/1988 | Minard et al. | 425/388 |
| 5,015,167 | 5/1991 | Charles | 425/388 |
| 5,051,083 | 9/1991 | Coluzzi | 264/322 |

FOREIGN PATENT DOCUMENTS

| | | |
|---|---|---|
| 19227/67 | 9/1968 | Australia . |
| 38358/68 | 12/1969 | Australia . |
| 76263/87 | 1/1988 | Australia . |
| 78638/87 | 6/1988 | Australia . |
| 59-201815 | 11/1984 | Japan .................................. 425/388 |
| 206900 | 11/1987 | New Zealand . |
| 1343304 | 1/1974 | United Kingdom ............... 425/388 |
| 2101927A | 1/1983 | United Kingdom ............... 425/388 |
| 2102330A | 2/1983 | United Kingdom ............... 425/388 |

*Primary Examiner*—Jay H. Woo
*Assistant Examiner*—Robert B. Davis
*Attorney, Agent, or Firm*—Fisher, Christen & Sabol

[57] ABSTRACT

An apparatus 1 for use in the preheating and forming of a material object about at least one mold 12 or die thereon. The apparatus has a primary platform 4 for supporting a length or sheet of material 13 thereon, a heating station 2 having a mechanism 8 for heating the object 13 laid on the primary platform 4 a mechanism for isolating the heating mechanism 8 form the object 13. The apparatus 1 also converts the heating station 2 to a forming station 3 which has associated therewith the mold 12. The forming station may either have an envelope 11 for creation of a vacuum seal or a second mold 17 for the purpose of forming object 13.

15 Claims, 3 Drawing Sheets

PROCESS AND APPARATUS FOR HEAT FORMING OF MATERIALS

BACKGROUND OF THE INVENTION

The present invention relates to a process for the heat bending of sheet materials and also relates to an apparatus for effecting such bending.

More particularly, the invention relates to a method of bending and forming sheet materials into a predetermined shape by the utilisation of vacuum forming and/or molding techniques following preheating of the material in or on an apparatus containing means to enable the said preheating, vaccuum forming and/or moulding techniques.

The invention is particularly adaptable for use in bending a sheet material such as that known under the trademark CORIAN. This is a material which, due to its physical properties, including its stiffness and brittleness when one face is placed under tension and another under compression as a result of bending, will fail.

Sheet materials generally and more particularly so CORIAN, even though they often possess significant elasticity especially when in large lengths or in large sheets do not have a physical property enabling small radius curves to be placed in the material without damage to the material.

There are in existence a number of heat forming processes whereby materials are preheated to enable a subsequent forming process to be carried out on the heated material.

One such process involves preheating of films for subsequent vacuum forming about a mold, whereby the preheated material conforms to the shape of the mold under vacuum conditions. Many variations of such a process have been in existence for some time, however, it has not hitherto previously been known to bend a stiff material such as CORIAN about a mold and under a vacuum following preheating treatment to a critical temperature to thereby enable the provision of curves and bends in the material having radii which are relatively small. It has also not been previously known in this context to use preheating, thence molding of the preheated material such as CORIAN to produce a curve or bend without the use of a vacuum.

It has been previously known to preheat CORIAN in an oven in an attempt to subsequently produce a curve in the material however, such trials have not been successful due to difficulties in handling of the CORIAN after preheating, difficulties in obtaining and maintaining an even heat distribution prior to and during bending of both small and large sheets, and difficulties in establishing an optimum heating time commensurate with the size and thickness of the material. Problems have also been experienced with cracking of the material, crazing of the material surface and reduced impact resistance of the material when adopting prior art forming methods.

As CORIAN is weakened by improper bending conditions due to the shortcommings of the prior art techniques and due to the particular physical nature of CORIAN and like materials it is desirable to provide an improved method and apparatus for the handling of CORIAN during the bending process from the preheating stage to the final bending stage.

Where a small radiused curve is to be placed in a thick sheet material such as CORIAN, bending to achieve this purpose under room temperature conditions would, due to the brittleness of the material under the bending conditions, result in the destruction of the material.

Previously, where it has been desired to form curves in such materials the effect was achieved by tedious machining and gluing of the material or by using the above described oven techniques. The purpose of the curves formed therein is primarily for functional and aesthetic value and to eliminate joins in fascia areas.

The bending of the material is facilitated by heating of the material to a critical temperature so that it achieves sufficient pliability to enable a vacuum forming operation to be performed in conjunction with a forming mold on the heated article. Alternatively, the vacuum may be eliminated in favour of mold forming only.

The critical heating of the article alters the physical and mechanical properties of the material matrix to enable small radius curves to be produced by bending about a mold without a failure in the material.

SUMMARY OF THE INVENTION

The present invention therefore seeks to provide an improved method for bending or forming of inherently stiff materials by preheating and vacuum mold forming techniques utilising an apparatus comprising essentially a preheating station and a molding station.

In an alternative embodiment of the forming method the vacuuming step may be substituted by die form bending and/or complementary sandwich molding following heating of an article which is to be die formed or moulded.

There are therefore two aspects of the invention, a method aspect and an apparatus aspect.

In the broadest form of the method aspect of the invention the invention comprises:

a method for the preheating and subsequent die or mold forming of a material comprising the steps of:

a) Placing a length or sheet of the material to be formed about the die or mold on a support apparatus having means to provide at least a heating station and a material forming station, b) causing heating elements at said heating station to come into direct or indirect contact with or, in close proximity to the said sheet material, c) allowing at least a portion of said material to be heated to a predetermined temperature, by said elements, d) isolating said heating elements away from said material, or isolating said material away from said heating elements, in order to remove the influence of the heating elements on the material, e) locating said material when heated on a material forming station at, adjacent or near said heating station, f) placing the material on a first forming mold or die of a predetermined shape and configuration, g) creating a seal via an envelope about said material so that said material and said mold is contained wholly within said envelope, h) applying a vacuum to the inside of said envelope so that the material which remains in the heated condition is caused to conform at least in part to the shape of at least a portion of said mold or die, i) allowing said material to cool so that the said shape is maintained in said material.

According to an alternative embodiment of the method aspect, the invention comprises:

a method for the preheating and subsequent die or mould forming of a material comprising the steps of:
a) Placing a length or sheet of the material to be formed about the die or mould on a support apparatus having means to provide at least a heating station and a material forming station,
b) causing heating elements at said heating station to come into direct or indirect contact with or in close proximity to the said sheet material,
c) allowing at least a portion of said material to be heated to a predetermined temperature by said elements,
d) isolating said heating elements away from said material, or isolating said material away from said heating elements so as to remove the influence of said heating elements,
e) locating said material when heated on the forming station which is at, adjacent or near said heating station,
f) placing the material on a first forming mold or die of a predetermined shape and configuration,
g) bringing a second forming mold or die which is complementary to said first forming mold into contact with said material so that said material to be formed is sandwiched between said molds or dies so as to conform to the profiled shape of at least a portion of one or both of said molds,
h) allowing said material to cool so that the shape so formed is maintained in said material.

According to the preferred embodiment, the heating elements are disposed either above, below or above and below the material to be formed. According to the apparatus aspect of the invention, there is provided an apparatus for use in the preheating and vacuum forming of a material object about at least one mold or die said apparatus comprising:

a primary platform for supporting a length or sheet of material thereon, a heating station having means for heating an object laid on said primary platform, means for isolating the heating means from the object;

means for conversion of the heating station to a forming station or for locating said object at a forming station, said forming station having associated therewith a mold or die to which said material will conform at least in part, said apparatus also comprising means to envelope at least said object and said formation station so that when a vacuum is applied to the inside of the envelope at least a part of the object is forced by virtue of said vacuum to conform to the shape of at least a portion of the said mold or die.

According to another embodiment of the apparatus aspect of the invention the invention comprises:

an apparatus for use in the preheating and mold or die forming of a material object about a mold or die said apparatus comprising;

a primary platform for supporting a length or sheet of material thereon;

a heating station having means for heating an object laid on said primary platform, means for isolating the heating means from the object
means for conversion of the heating station to a forming station or locating said object at a forming station, said forming station having associated therewith a first mold or die and a second mold or die having a profiled shape which is complementary to said first mold or die so that when said material is placed on said first mold or die said second mold or die which is vertically, pivotally, rotationally or laterally adjustable is brought into contact with said material causing at least a part of said material to be deformed or bent about said first mold or die and thereby causing said part to conform to the shape of said second and/or said first mold or die.

According to the preferred embodiment of the apparatus aspect of the invention, the primary platform comprises a table having associated therewith an optionally moveable array of heating elements configured such that the elements exist above and below the object when the object is placed in the heating station. The platform in combination with the heating elements form the heating station. In one embodiment the elements are contained in a housing or housings which are vertically adjustable to enable raising and lowering of the elements according to heating requirements. The housings also act in controlling the temperature of the material to be heated. The heating elements may also be located in the platform i.e. underneath the material being worked on.

The forming station in the preferred embodiment comprises the primary platform and means thereon to receive and support a mold or die. The station is adapted to enable the creation of an envelope about the forming station which in turn enables an airtight space to be formed enabling a negative pressure to be applied to the space. The forming station has means to enable sealing of and adjustment of the position of the envelope.

BRIEF DESCRIPTION OF THE DRAWINGS

The invention will now be described in more detail according to a preferred but non limiting embodiment of the invention and with reference to the accompanying illustrations wherein.

DETAILED DESCRIPTION OF THE PREFERRED EMBODIMENTS

Figure 1:
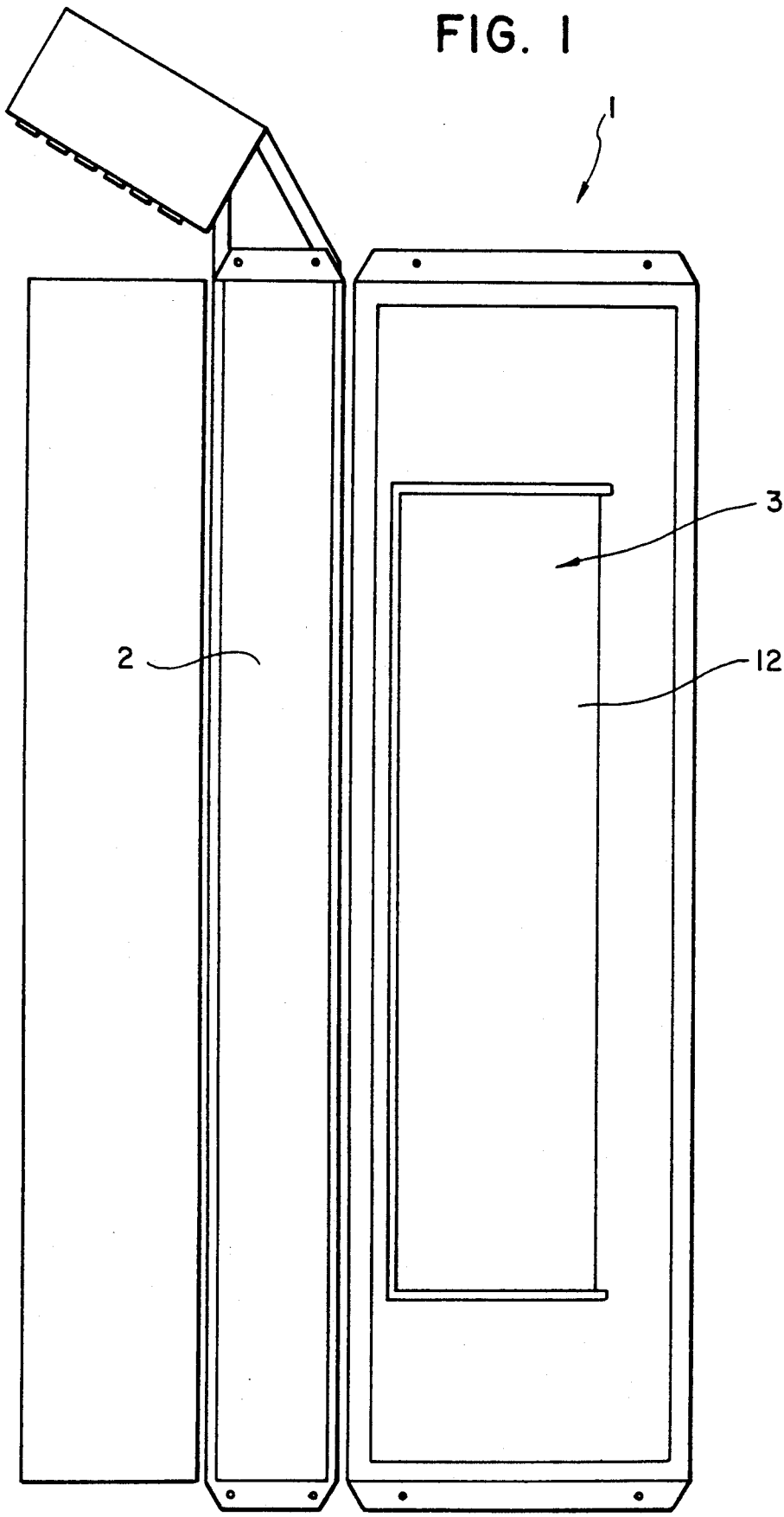
FIG. 1 shows a plan view of the forming apparatus according to a preferred embodiment of the apparatus aspect of the present invention.
Figure 2:
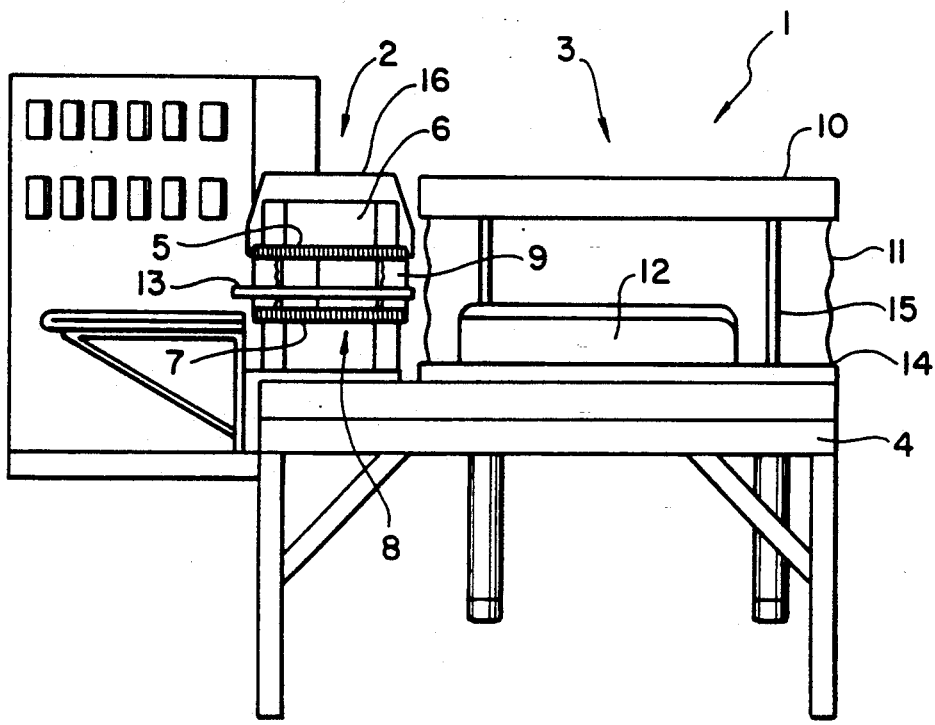
FIG. 2 shows an end elevation of the apparatus of FIG. 1

Referring to FIG. 1 there is shown a plan view of a material forming apparatus 1 comprising a primary platform 2 and a vacuum assisted forming platform 3. The platform 2 and the forming platform 3 are supported by a support table 4 (see FIG. 2).

The platform 2 has disposed above it an array of heating elements 5 arranged in a housing 6. The housing 6 is adapted to be moved vertically to enable the elements to be moved close to the object 13 to be heated thence to be moved away from the object when the required temperature has been reached.

A further array of heating elements 7 is contained in well 8 so that the object can be heated also from underneath where required. The object which is placed in passage 9 overlies these heating elements so that in conjunction with heating elements 5 the object 13 can be evenly heated on both sides until the required degree of heating of the object is achieved.

In one embodiment the molding platform 3 comprises a mainframe structure 10 for supporting a silicone envelope 11 which envelopes mold 12 and object 13 when placed on top of mold 12. When the object to be operated on is placed on mold 12 following heating on heating platform 2 the envelope 11 is then brought downwards either manually or automatically so that sealing of the envelope is effected at interphase 14. The mainframe 10 slidable moves in an upward and downward direction along guide posts 15, either manually, or under the assistance of hydraulic means (not shown). The sealing creates an airtight seal thus enabling an applied vacuum to cause the object 13 to conform to the profiled shape of mold 12. Using this process sheet materials and indeed materials of other shapes can be formed with a large variety of radiused curves or bends particularly at their extremities thereby eliminating the need for other machining and or joining methods to form such bends.

In an alternative embodiment the aforementioned vacuuming step is not used. In this case rather than relying on vacuuming to cause the desired profiled bend to be formed in the material a second mold is used. The second mold has a complementary shape which squeezes the heated CORIAN material between the molds. The CORIAN then conforms to the shape of at least the first mold 12. The first mold acts as a die about which the CORIAN bends to conform to the predetermined shape.

Figure 4:
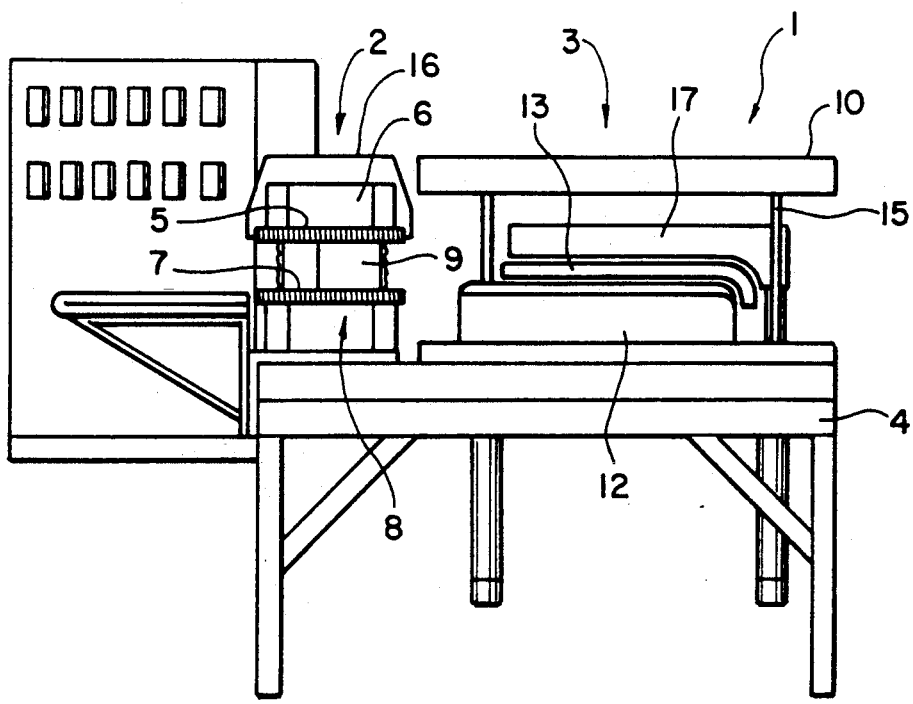
FIG. 4 shows the view of FIG. 2 without the envelope but with a second die
Figure 3:
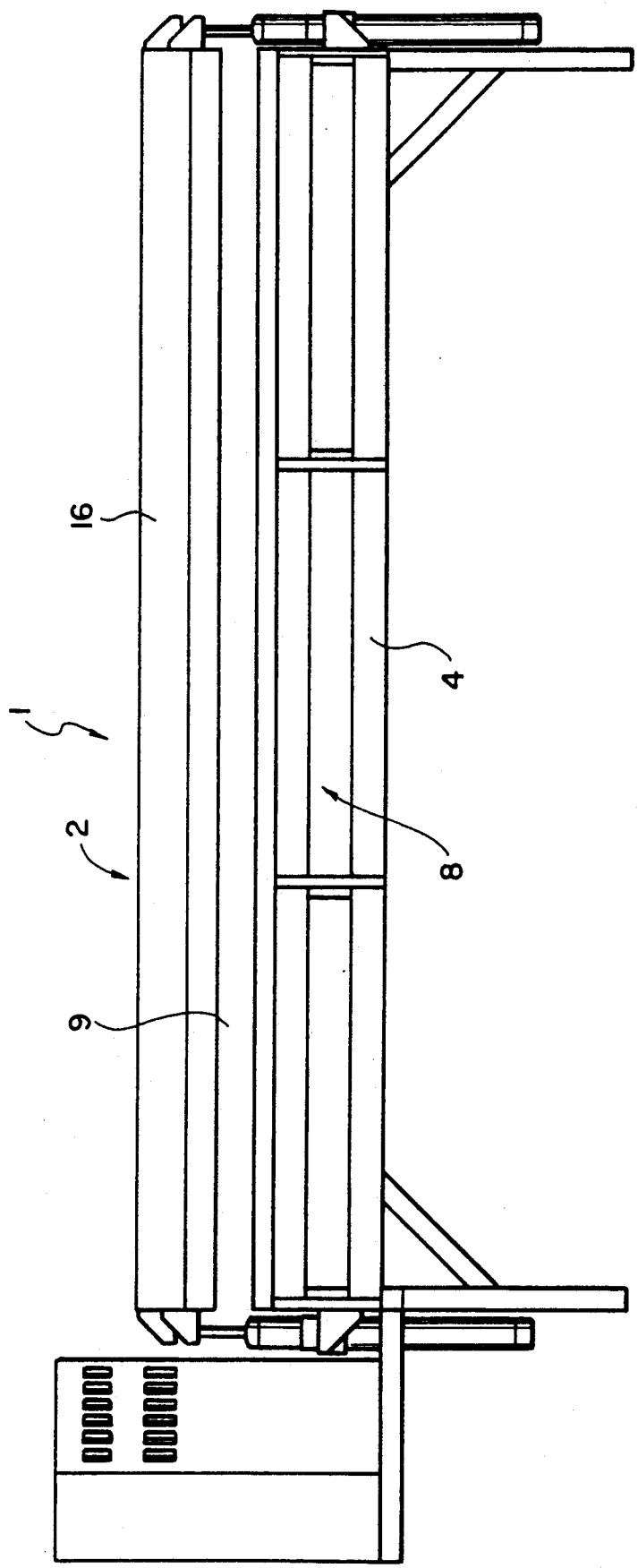
FIG. 3 shows a side elevation of the apparatus of FIG. 1

In this alternative embodiment of the invention the forming station is adapted with a second die or mold 17 (see FIG. 4) which sandwiches the object 13 between the die or mould 12. According to this embodiment the mold 17 may be pivotally attached to either platform 14 or to mold 12. The use of the second mold 17 provides an alternative to the use of vacuum forming about mould 12.

The heating temperatures and times are critical to the effective bending of the material using the above described process and apparatus. The heating temperature and time varies according to the thickness of the material. A typical case is a 13 mm sheet which would require a temperature of approximately 180° C. for 3½ minutes. A 19 mm sheet may require 5½ minutes heating at 180° C.

The material to be formed would preferably fall within the thickness range of 8 mm to 20 mm. Preferably the material is heated for a period between 2 and 4 minutes and at a temperature of approximately 180°. Generally, the thinner the sheet to be formed, the shorter the time required to achieve the requisite plasticity in the sheet. Preferably the heating range is 160° to 200° C., and it has been found that 180° C. is an optimum temperature to achieve the required plasticity.

Preferably the sheets which are formed by the apparatus and methodology of the present invention are provided with a radiused edge along the longitudinal length of the sheet. Ideally the radius of curvature of the radiused edge would fall within the range 12 mm to 150 mm however, this is not to be construed as limiting of the feasible radii that may be achieved using this method.

The process is suitable for use with many acrylic products preferably in sheet form. To control temperature and assist in heat retention and even distribution a housing 16 is utilised to house the heating elements.

Although the invention has been described in relation to the bending of CORIAN, it is conceivable that the process is useful for bending other materials which may be brittle at room temperature but which may become pliable under heat treatment.

It will be recognised by persons skilled in the art that numerous variations and modifications can be made to the invention as hereinbefore described and with reference to the accompanying illustrations.

I claim:

1. An apparatus for use in preheating and vacuum forming of a material object about at least one mold thereon, said apparatus comprising:
    a primary support platform for supporting a heating station and a forming station;
    the heating station comprising a second support platform, means for heating a planar sheet material laid on said second support platform, said planar sheet material being stiff and brittle at room temperature and having a thickness of from 8 mm to 20 mm;
    means for advancing the heating means towards the sheet material and isolating the heating means from the sheet material;
    said forming station being adjacent the heating station and comprising a first mold to whose shape the material will wholly or partly conform when the material is brought into a position with the mold and following heating of the material;
    means for enabling transfer of the material object from the heating station to a forming station;
    said apparatus also comprising flexible envelope means to envelop wholly or partly the material and said formation station so that when a vacuum is applied to the inside of the envelope at least a portion of the material is forced to conform to the shape of the corresponding portion of the mold, whereby said material is formed into curves having a radius of 12 mm to 150 mm.

2. An apparatus according to claim 1 wherein the heating elements are each contained within a housing which is configured to temporarily trap heat.

3. An apparatus according to claim 2 wherein the location of the formation station beside the heating station enables transfer to the forming station of the material after heating of the material.

4. An apparatus according to claim 3 wherein the formation station also comprises a framework adapted to support an envelope material which enables creation of a sealed envelope.

5. An apparatus according to claim 3 wherein the said seal is created when the extremities of said envelope material are sealably connected to the primary platform.

6. An apparatus according to claim 5 further comprising a vacuum pump to facilitate the creation of a vacuum within the envelope.

7. An apparatus according to claim 1 also comprising a control means to enable control of heating temperature and duration.

8. A method for preheating and subsequent mold forming of a material utilizing an apparatus comprising:
    a primary support platform for supporting a heating station and a forming station;
    the heating station comprising a second support platform, means for heating a planar sheet material laid on said second support platform, said planar sheet material being stiff and brittle at room temperature and having a thickness of from 8 mm to 20 mm;

means for advancing the heating means towards the sheet material and isolating the heating means from the sheet material;

said forming station being adjacent the heating station and comprising a first mold to whose shape the material will wholly or partly conform when the material is brought into a position with the mold and following heating of the material;

means for enabling transfer of the material object from the heating station to a forming station;

said apparatus also comprising flexible envelope means to envelop wholly or partly the material and said formation station so that when a vacuum is applied to the inside of the envelope at least a portion of the material is forced to conform to the shape of the corresponding portion of the mold, whereby said material is formed into curves having a radius of 12 mm to 150 mm, said method comprising the steps of:

a) placing a length or sheet of the material to be formed about the mold on a support apparatus comprising a heating station and a material forming station, b) bringing heating elements at said heating station into direct or indirect contact with or, in close proximity to said sheet material, c) evenly heating at least a portion of said material to be molded to a preset temperature, by said elements, d) isolating said heating elements from said material, in order to remove the influence of the heating elements on the material, e) locating said material when heated on a material forming station near said heating station, f) placing the material on a first forming mold or die of a predetermined shape and configuration, g) creating a seal via a flexible envelope about said material so that said material and said mold is contained wholly within said envelope, h) applying a vacuum to the inside of said envelope so that the material which remains in the heated condition conforms to the shape of at least a portion of said mold, i) allowing said material to cool so that the said shape is maintained in said material.

9. A method for preheating and subsequent mold forming of a material utilizing an apparatus comprising:

a primary support platform for supporting a heating station and a forming station;

the heating station comprising a second support platform, means for heating a planar sheet material laid on said second support platform, said planar sheet material being stiff and brittle at room temperature and having a thickness of from 8 mm to 20 mm;

means for advancing the heating means towards the sheet material and isolating the heating means from the sheet material;

said forming station being adjacent the heating station and comprising a first mold to whose shape the material will wholly or partly conform when the material is brought into a position with the mold and following heating of the material;

means for enabling transfer of the material object from the heating station to a forming station;

said apparatus also comprising a second mold having a profiled shape which is complimentary to said first mold so that when said material object is placed on said first mold said second mold which is vertically, and/or laterally adjustable is brought into contact with the material object causing at least a part of the material object to be deformed or bent about the first mold and thereby causing said at least a part to conform to the shape of said second and/or said first mold, whereby said material is formed into curves having a radius of 12 mm to 150 mm, said method comprising the steps of:

a) placing a length or sheet of the material to be formed about the mold on a support apparatus comprising a heating station and a material forming station, b) bringing the heating elements at said heating station into direct or indirect contact with or in close proximity to said sheet material, c) allowing at least a portion of said material to be evenly heated to a predetermined temperature by said elements, d) isolating said heating elements from said material, so as to remove the influence of said heating elements, e) locating said material when heated on a molding station at, adjacent or near said heating station, f) placing the material on a first forming mold of a predetermined shape and configuration, g) bringing a second forming mold which is complementary to said first forming mold into contact with said material so that said material to be formed is sandwiched between said molds so as to conform to the shape of at least a portion of one or both of said molds, h) allowing said material to cool so that the shape so formed is maintained in said material.

10. A method according to claim 8 wherein the material is heated for a period within the range of 2 to 4 minutes at a temperature within the range 160° C. to 200° C.

11. A method according to claim 10 wherein when a sheet of material of thickness 13 mm is to be formed to the required shape, the material is heated to a temperature of 180° C. and maintained at that temperature for approximately 3 ½ minutes.

12. A method according to claim 8 wherein when a sheet of material of thickness 19 mm is to be formed to the required shape the material is heated to a temperature of 180° C. and maintained at that temperature for approximately 5 ½ minutes.

13. An apparatus according to claim 1 wherein the said heating elements are located within the platform.

14. An apparatus according to claim 13 wherein the said molds or dies are made from either timber, metal, rubber or plastics material.

15. An apparatus according to claim 1 wherein said advancing and isolating of the heating means is effected by adjustable vertical displacement of heating elements disposed above the sheet to be heated.

* * * * *